United States Patent [19]

Reiher et al.

[11] Patent Number: 5,569,748
[45] Date of Patent: Oct. 29, 1996

[54] 2-AMINO-8-HYDROXY-6-SULFONAPHTALENE-CONTAINING MONOAZO REACTIVE DYES

[75] Inventors: Uwe Reiher, Hofheim; Werner H. Russ, Flörsheim, both of Germany

[73] Assignee: Hoechst Aktiengesellschaft, Germany

[21] Appl. No.: 281,842

[22] Filed: Jul. 28, 1994

[30] Foreign Application Priority Data

Jul. 31, 1993 [DE] Germany .................. 43 25 784.4

[51] Int. Cl.$^6$ .................. C09B 62/51; C09B 62/085; D06P 1/38
[52] U.S. Cl. .................. 534/642; 534/638
[58] Field of Search .................. 534/638, 642

[56] References Cited

U.S. PATENT DOCUMENTS

| | | | |
|---|---|---|---|
| 2,891,941 | 6/1959 | Fasciati et al. | 534/638 |
| 2,979,498 | 4/1961 | Andrew et al. | 534/638 |
| 4,667,022 | 5/1987 | Nakamatsu et al. | 534/638 |
| 4,818,247 | 4/1989 | Tzikas et al. | 534/638 X |
| 4,837,310 | 6/1989 | Morimitsu et al. | 534/638 |

FOREIGN PATENT DOCUMENTS

| | | |
|---|---|---|
| 0070806 | 1/1983 | European Pat. Off. . |
| 0265928 | 5/1988 | European Pat. Off. . |
| 2924889 | 1/1980 | Germany . |
| 0836248 | 6/1960 | United Kingdom . |
| 923887 | 4/1963 | United Kingdom . |
| 2055880 | 3/1981 | United Kingdom . |

OTHER PUBLICATIONS

Omura, Chemical Abstracts, 121:303035, 1995, "Design of Chlorine–Fast Reactive Dyes. Part 4. Degredation of Amino–Containing Azo Dyes by Sodium Hypochlorite".
*Dyes Pigm.*, 26 (1), 33–50 (1994).
CIBA, Chemical Abstracts, 55:19255 h (1961).

*Primary Examiner*—Fiona T. Powers
*Attorney, Agent, or Firm*—Connolly & Hutz

[57] ABSTRACT

There are described novel monoazo dyes of the below-indicated and formula (1) which have fiber-reactive properties and are used as dyes for dyeing hydroxy- and/or carboxamido-containing material, in particular fiber material, such as wool and synthetic polyamide and in particular cellulose fiber materials, such as cotton.

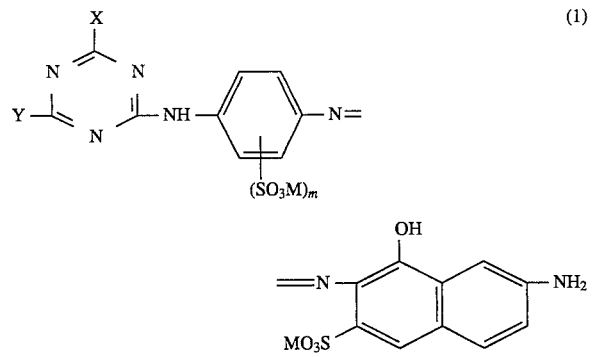

X, Y, M and m are as defined in claim 1.

7 Claims, No Drawings

2-AMINO-8-HYDROXY-6-SULFONAPHTALENE-CONTAINING MONOAZO REACTIVE DYES

The invention relates to the technical field of the fiber-reactive dyes.

The practice of dyeing with fiber-reactive dyes has led to heightened expectatations of the quality of the dyeings and of the economy of the dyeing processes. Consequently there continues to be a demand for novel fiber-reactive dyes that have improved properties. Especially in demand for the production of dyeings having a red shade are the reactive dyes which yield such dyeings with high fastness properties. It is true that British Patent No. 836,248, U.S. Pat. No. 2,979,498 and European Patent Application Publication No. 0 070 806 disclose numerous red fiber-reactive dyes, but the fastness properties of the dyeings obtainable with these dyes, especially the lightfastness and the perspiration lightfastness, are in need of improvement.

The present invention now provides novel azo compounds having improved properties in this respect, which azo compounds conform to the formula (1)

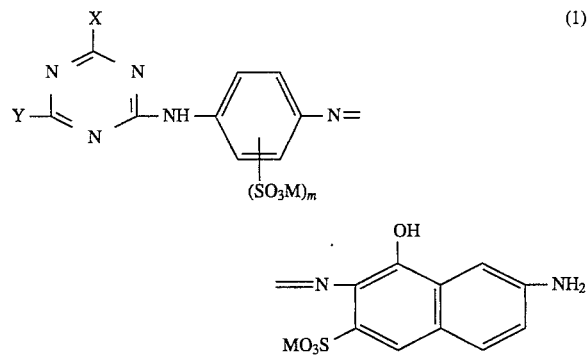

where

M is hydrogen or an alkali metal, such as sodium, potassium or lithium;

m is 1 or 2;

X is fluorine, chlorine or a group of the formula (2a) or (2b)

where $R^A$ is alkyl of 1 to 10 carbon atoms, preferably of 1 to 4 carbon atoms, such as methyl and ethyl, or cycloalkyl of 5 to 8 carbon atoms, such as cyclohexyl, which may be additionally substituted by 1 or 2 methyl groups, or is alkyl of 2 to 8 carbon atoms which is interrupted by one or two hetero groups, for example by hetero groups selected from the group consisting of —O—, —NH—, —NH—CO—, —CO—NH—, —CO—, —SO$_2$—, —NH—SO$_2$— and —SO$_2$—NH—, or is benzyl or sulfoalkyl of 1 to 4 carbon atoms, such as sulfomethyl and β-sulfoethyl, preferably β-sulfoethyl, and $R^B$ is hydrogen, alkyl of 1 to 10 carbon atoms, preferably of 1 to 4 carbon atoms, such as methyl and ethyl, or cycloalkyl of 5 to 8 carbon atoms, such as cyclohexyl, which may be additionally substituted by 1 or 2 methyl groups, or is alkyl of 2 to 8 carbon atoms which is interrupted by one or two hetero groups, for example by hetero groups selected from the group consisting of —O—, —NH—, —NH—CO—, —CO—NH—, —CO—, —SO$_2$—, —NH—SO$_2$— and —SO$_2$—NH—, or is benzyl, sulfoalkyl of 1 to 4 carbon atoms, such as sulfomethyl and β-sulfoethyl, or cyano, and is preferably cyano;

Y is fluorine, chlorine or a group of the formula (3a)

where $R^0$ is a group of the formula (4a), (4b) or (4c)

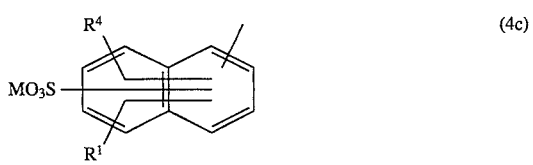

where

M is as defined above,

Z is vinyl or is ethyl which is substituted in the β-position by a substituent which is eliminable by alkali to leave the vinyl group, alk is alkylene of 2 to 4 carbon atoms, $R^1$ is hydrogen, carboxy, sulfo or preferably a group of the formula —SO$_2$—Z, wherein Z is as defined above, $R^2$ is hydrogen, alkyl of 1 to 4 carbon atoms, such as ethyl and in particular methyl, alkoxy of 1 to 4 carbon atoms, such as ethoxy and in particular methoxy, chlorine, bromine, carboxy, sulfo or nitro, preferably hydrogen, alkyl of 1 to 4 carbon atoms, alkoxy of 1 to 4 carbon atoms or sulfo, $R^3$ is hydrogen, alkyl of 1 to 4 carbon atoms, such as ethyl and in particular methyl, alkoxy of 1 to 4 carbon atoms, such as ethoxy and in particular methoxy, chlorine or bromine, preferably hydrogen or alkoxy of 1 to 4 carbon atoms, and $R^4$ is hydrogen, sulfo or carboxy, preferably hydrogen or sulfo, or Y is a group of the formula (3b)

where Z and alk are each as defined above, or

Y is a group of the formula (3c)

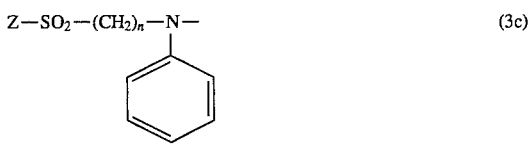

where n is from 1 to 4, preferably 2 or 3, and

Z is vinyl or is ethyl which is substituted in the β-position by a substituent which is eliminated by alkali to leave a vinyl group.

Preferably X is fluorine, chlorine or cyanoamino, and preferably Y is a group of the formula (3a) where $R^0$ is a group of the formula (4a) or (4b) or Y is a group of the formula (3b) or (3c) where alk is 1,2-ethylene or 1,3-propylene, $R^1$ is hydrogen or preferably β-sulfatoethylsulfonyl or vinylsulfonyl, $R^2$ is hydrogen, methyl, methoxy or ethoxy, $R^3$ is hydrogen, methoxy or ethoxy, Z is vinyl or β-sulfatoethyl, and n is 2 or 3. In the formula (4c) the free bond of the naphthalene ring is preferably in the β-position thereof.

Alkali-eliminable substituents located in the β-position of the ethyl group of Z include for example halogen atoms, such as bromine and chlorine, ester groups of organic carboxylic and sulfonic acids, as of alkylcarboxylic acids, substituted or unsubstituted benzenecarboxylic acids and of substituted or unsubstituted benzenesulfonic acids, such as alkanoyloxy of 2 to 5 carbon atoms, in particular acetyloxy, benzoyloxy, sulfobenzoyloxy, phenylsulfonyloxy and toluylsulfonyloxy, also acid ester groups of inorganic acids, as of phosphoric acid, sulfuric acid and thiosulfuric acid (phosphato, sulfato and thiosulfato groups), similarly dialkylamino groups having alkyl groups of in each case 1 to 4 carbon atoms, such as dimethylamino and diethylamino. Preferably Z in the formulae (4b) and (4c) is β-sulfatoethyl or vinyl and particularly preferably β-sulfatoethyl, and preferably Z in the formulae (4a) and (3c) is β-sulfatoethyl, β-chloroethyl or vinyl, particularly preferably β-chloroethyl and vinyl.

In the abovementioned formulae and also in the formulae given hereinafter, the individual symbols not only of different but also of identical designation within a formula can have, within the scope of their definitions, meanings identical to or different from one another. The terms "sulfo", "carboxy", "thiosulfato", "phosphato" and "sulfato" include not only the acid form thereof but also the salt form thereof. Accordingly sulfo groups are groups conforming to the formula —$SO_3M$, carboxy groups are groups conforming to the formula —COOM, thiosulfato groups are groups conforming to the formula —S—$SO_3M$, phosphato groups are groups conforming to the formula —$OPO_3M_2$, and sulfato groups are groups conforming to the formula —$OSO_3M$, in each of which M is as defined above.

X is for example methoxy, ethoxy, propoxy, ethoxymethoxy, β-ethoxyethoxy, β-aminoethoxy, benzyloxy, sulfomethoxy, sulfoethoxy, methylamino, ethylamino, propylamino, cyclohexylamino, β-(ethylamino)ethylamino, β-ethoxyethylamino, benzylamino, β-sulfoethylamino and in particular cyanoamino, fluorine and chlorine.

Groups of the formulae (4a), (4b) and (4c) in the radical Y include for example 2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-3-(sulfatoethylsulfonyl)phenyl, 2-chloro-4-(β-sulfatoethylsulfonyl)phenyl, 2-bromo-4-(β-sulfatoethylsulfonyl)phenyl, 4-methoxy-3-(β-sulfatoethylsulfonyl)phenyl, 4-chloro-3-(β-sulfatoethylsulfonyl)phenyl, 2-ethoxy-4or -5-(β-sulfatoethylsulfonyl)phenyl, 2-methyl-4-(β-sulfatoethylsulfonyl)phenyl, 2-methoxy-5- or -4-(β-sulfatoethylsulfonyl)phenyl, 2,4-diethoxy-5-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2- or 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2-sulfo-4-vinylsulfonylphenyl, 2-hydroxy-4- or -5-(β-sulfatoethylsulfonyl)phenyl, 2-chloro-4- or -5-(β-chloroethylsulfonyl)phenyl, 2-hydroxy-5-(β-sulfatoethylsulfonyl)phenyl, 2-hydroxy-3-sulfo-5-(β-sulfatoethylsulfonyl)phenyl, 3- or 4-(β-acetoxyethylsulfonyl)phenyl, 6-carboxy-1-sulfonaphth-2-yl, 5-(β-sulfatoethylsulfonyl)naphth-2-yl, 6- or 7- or 8-(β-sulfatoethylsulfonyl)naphth-2-yl, 6-(β-sulfatoethylsulfonyl)-1-sulfonaphth-2-yl, 5-(β-sulfatoethylsulfonyl)-1-sulfonaphth-2-yl, 8-(β-sulfatoethylsulfonyl)-6-sulfonaphth-2-yl, β-vinylsulfonylethylamino, β-(β'-chloroethylsulfonyl)ethylamino, β-(β'-sulfatoethylsulfonyl)ethylamino, γ-(β'-chloroethylsulfonyl)propylamino, γ-(β'-sulfatoethylsulfonyl)propylamino and γ-(vinylsulfonyl)propylamino.

The present invention furthermore relates to a process for preparing the monoazo compounds of the formula (1) according to the invention, which comprises diazotizing a compound of the formula (5)

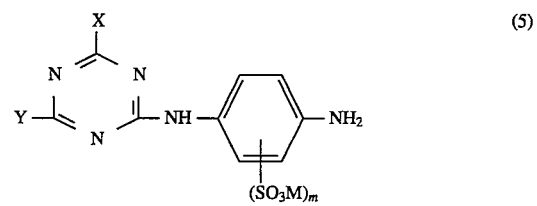

(5)

where X, Y, M and m are as defined above, and coupling the resulting diazonium compound with a compound of the formula (6)

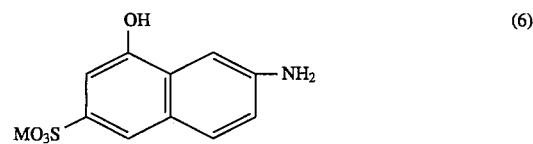

(6)

where M is as defined above.

The diazotization and coupling reactions are carried out analogously to known procedures, for instance the diazotization is generally at a temperature between −5° C. and +15° C. and a pH below 2 by means of a strong acid and an alkali metal nitrite in a preferably aqueous medium and the coupling reaction generally at a temperature between 0° and 50° C. and a pH between 3 and 7, preferably between 4 and 6.5, in a preferably aqueous medium.

The preparation of the starting compounds of the formula (5) is carried out analogously to known procedures of reacting an aromatic amino compound with a halogen-substituted triazine. Thus, the synthesis of a starting compound of the formula (5) can be effected by reacting a phenylenediamine compound of the formula (7)

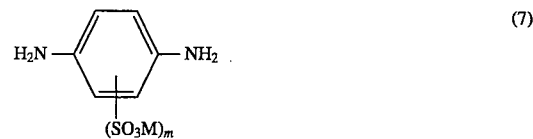

(7)

where M and m are each as defined above, with a compound of the formula (8)

(8)

where X and Y are each as defined above and Hal is chlorine or fluorine, in an aqueous or aqueous-organic medium in suspension or solution. If the reaction is carried out in an aqueous-organic medium, the organic medium is for example acetone, dimethylformamide, dimethyl sulfoxide or N-methylpyrrolidone. Advantageously the hydrogen halide liberated in the course of the condensation is continuously neutralized by addition of aqueous alkali metal hydroxides, carbonates or bicarbonates. The condensation reaction of the halo-s-triazine of the formula (8) is generally carried out at a temperature between −5° C. and +90° C., in the case of X being fluorine or chlorine and Y being a group of the formula (3a), (3b) or (3c) preferably at a temperature between −5° C. and +25° C., and at a pH between 6 and 8. If in the formula (8) X is a group of the formula (2a) or (2b) and Y is a group of the formula (3a), (3b) or (3c), the reaction is generally carried out at a pH between 1 and 5 and at a temperature between 50° and 90° C. Alternatively, the starting compounds of the formula (5) where Y is a group of the formula (3a), (3b) or (3c) and X is chlorine can also be prepared by reacting a compound of the formula (7) with cyanuric chloride and subsequently condensing the resulting product with an amine of the formula Y—H where Y is a group of the formula (3a), (3b) or (3c). The reaction with cyanuric chloride generally takes place at a temperature between −5° C. and +30° C., preferably between 0° and 20° C., and at a pH between 7 and 9. The subsequent condensation reaction with the amino compound conforming to the formula Y—H is generally carried out at a temperature between 0° and 20° C. and at a pH between 0 and 5.

The starting compounds conforming to the formulae (6) and (7) and also to the formulae (5) and (8) have been described before in general terms and can be prepared by prior methods analogously to known procedures. Some of the starting compounds conforming to the formulae (5) and (8) where Y is a radical of the formula (3c) with n equal to 3 or 4, and similarly their N-phenylamino components conforming to the formula (9)

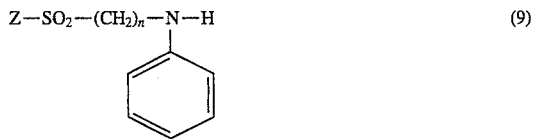

where n is 3 or 4, have not been described per se. These amino compounds can be prepared for example by reacting N-allyl-N-acetylaniline (see J. Org. Chem. 14, 1099 (1949)) analogously to the procedure described in German Offenlegungsschrift No. 4,106,106 with 2-mercaptoethanol in the presence of a free radical initiator, oxidizing the resulting N-[γ-(β'-hydroxyethylthio)propyl]-N-acetyl-aniline compound to the sulfonyl compound, for example by means of hydrogen peroxide in the presence of a catalytic amount of a transition metal compound, for example tungsten oxide. The resulting sulfonyl compound then has the acetyl group eliminated from it hydrolytically in the alkaline or acidic range, preferably in hydrochloric acid aqueous solution, for example in from 5 to 30% strength aqueous hydrochloric acid, at a temperature between 80° and 100° C. The resulting N-phenyl-N-[γ-(β'-hydroxyethylsulfonyl)propyl]amine can be separated out of the aqueous phase of the neutralized aqueous synthesis solution. Its β-hydroxyethylsulfonyl group can be esterified by conventional methods, for example by means of concentrated sulfuric acid at a temperature between 10° and 30° C. to form the β-sulfatoethylsulfonyl compound. The reaction of this amine of the formula (9) to form the compound of the formula (8) can be carried out analogously to known procedures of reacting amino compounds with a dihalotriazine compound or with a cyanuric halide.

The separation of the compounds of the formula (1) prepared according to the invention—hereinafter called compounds (1)—from the synthesis batches is effected by generally known methods either by precipitating from the reaction medium by means of electrolytes, for example sodium chloride or potassium chloride, or by evaporating the reaction solution, for example by spray drying, in which case this reaction solution may have a buffer substance added to it.

The compounds (1) have fiber-reactive properties and very good dye properties. They can therefore be used for dyeing hydroxy-and/or carboxamido-containing materials, in particular fiber material, and also leather. Especially interesting is their use in combination dyeings, such as trichromatic dyeing. They can also be used directly for dyeing in the form of the as-synthesized solutions as a liquid preparation, if desired after addition of a buffer substance and if desired after concentrating.

The present invention therefore also provides for the use of compounds (1) for dyeing hydroxy—and carboxamido-containing materials, i.e. processes for dyeing such materials by bringing the compound (1) onto or into the material and fixing it thereon or therein by means of heat or with the aid of an alkaline agent or by means of both measures. Dyeing is to be understood as including mass coloration, for example polyamide films, and printing. The materials are preferably used in the form of fiber materials, particularly in the form of textile fibers, as in the form of fabrics and yarns, for example in the form of hanks and packages.

Hydroxy-containing materials are natural or synthetic hydroxy-containing materials, for example cellulose fiber materials or their regenerated products and polyvinyl alcohols. Cellulose fiber materials are preferably cotton but also other vegetable fibers, such as linen, hemp, jute and ramie fibers; regenerated cellulose fibers include for example staple viscose and filament viscose.

Carboxamido-containing materials include for example synthetic and natural polyamides and polyurethanes, in particular in the form of fibers, for example wool and other animal hairs, silk, leather, nylon-6,6, nylon-6, nylon-11 and nylon-4.

The compounds (1) can be applied to and fixed on the substrates mentioned, in particular on the fiber materials mentioned, by the techniques customary for water-soluble dyes, in particular for fiber-reactive dyes. For instance, on cellulose fibers they produce from a long liquor by the exhaust method and by means of various acid-binding agents with or without neutral salts, such as sodium chloride or sodium sulfate, dyeings having very good color yields and also excellent color build-up combined with high degrees of fixation. They are dyed at temperatures between 40° and 105° C., if desired at temperatures up to 120° C. under superatmospheric pressure, and if desired in the presence in the aqueous bath of customary dyeing assistants. One possible procedure is to introduce the material into the warm bath and to gradually heat the bath to the desired dyeing temperature and to complete the dyeing process at that temperature. The neutral salts which speed up the exhaustion of the compounds (1) can if desired not be added to the bath until after the actual dyeing temperature has been reached.

The padding process likewise produces excellent color yields with high degrees of fixation and a very good color build-up on cellulose fibers, on which fixing can be effected by batching at room temperature or elevated temperature, for example at up to about 60° C. by steaming or with dry heat in a conventional manner.

Similarly, the customary printing processes for cellulose fibers, which can be carried out either single-phase, for example by printing with a print paste containing sodium carbonate or some other acid-binding agent as well as the compound (1) and by subsequent steaming at 100° to 103° C., or two-phase, for example by printing with a neutral or weakly acid print paste containing the colorant and subsequent fixation either by passing the printed material through a hot electrolyte-containing alkaline bath or by overpadding with an alkaline electrolyte-containing padding liquor with a subsequent batching of this treated material or subsequent steaming or subsequent treatment with dry heat, produce strong prints with well-defined contours and a bright white ground. The appearance of the prints is not greatly affected by variations in the fixing conditions. Not only in dyeing but also in printing, the degrees of fixation obtained with the compounds (1) are very high.

When fixing by means of dry heat in accordance with the customary thermofix processes, hot air from 120° to 200° C. is used. In addition to the customary steam at 101° to 103° C. it is also possible to use superheated steam and high-pressure steam at temperatures of up to 160° C.

The acid-binding agents which effect the fixation of the compounds (1) on the cellulose fibers include for example water-soluble basic salts of the alkali metals and the alkaline earth metals of inorganic or organic acids as well as compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

By treating the compounds (1) with the acid-binding agents with or without heating, these compounds are chemically bonded to the cellulose fibers; especially the cellulose dyeings have after the customary aftertreatment by rinsing to remove unfixed portions of the compounds (1) excellent wetfastness properties, in particular since such unfixed portions are easily washed off on account of their good solubility in cold water.

The dyeings on polyurethane and polyamide fibers are customarily carried out from an acid medium. For instance, the dyebath may have added to it acetic acid and/or ammonium sulfate and/or acetic acid and ammonium acetate or sodium acetate in order to bring it to the desired pH. To achieve a usable levelness of the dyeing, it is advisable to add customary leveling aids, for example based on a reaction product of cyanuric chloride with three times the molar amount of an aminobenzenesulfonic acid and/or an aminonaphthalenesulfonic acid or based on a reaction product of for example stearylamine with ethylene oxide. Generally the material to be dyed is introduced at a temperature of about 40° C. into the bath, agitated therein for some time, the dyebath is then adjusted to the desired weakly acid, preferably weakly acetic acid, pH, and the actual dyeing is carried out at a temperature between 60° and 98° C. However, the dyeings can also be carried out at boiling point or at temperatures up to 120° C. (under super-atmospheric pressure).

The dyeings and prints prepared with the compounds (1) are notable for bright shades. Especially the dyeings and prints on cellulose fiber materials have, as mentioned, in addition a high color strength, good lightfastness and very good wet fastness properties, such as wash, milling, water, seawater, cross-dyeing and perspiration fastness properties, also good fastness to pleating, hot pressing and rubbing.

Of particular note are the high degrees of fixation achievable with the dyes of the invention on cellulose fiber materials, which can be above 90% in the case of printing processes and pad-dyeing processes. A further advantage of the compounds (1) is the ease of washing off the portions which have not become fixed during printing or dyeing, as a result of which the washing of the printed or dyed cellulose fiber materials can be accomplished with low quantities of wash liquor with or without an energy-saving temperature regime during the washing process.

The Examples which follow illustrate the invention. Parts and percentages are by weight, unless otherwise stated. Parts by weight relate to parts by volume as the kilogram relates to the liter.

The compounds described in the Examples in terms of a formula are indicated in the form of the free acid; generally they are prepared and isolated in the form of their alkali metal salts, such as lithium, sodium or potassium salts, and used for dyeing in the form of their salts. Similarly, the starting compounds and components mentioned in the form of the free acid in the following Examples, in particular Table Examples, can be used in the synthesis as such or in the form of their salts, preferably alkali metal salts.

The absorption maxima ($\gamma_{max}$) in the visible region reported for the dyes of the invention were determined in aqueous solution using their alkali metal salts. In the Table Examples the $\gamma_{max}$ values are given in parentheses in the hue column; the wavelength unit is nm.

EXAMPLE 1

4.3 parts of cyanamide are stirred into a suspension of 18.4 parts of cyanuric chloride in 200 parts of water and 200 parts of ice. Concentrated aqueous sodium hydroxide solution is used to set a pH of 9 and the batch is subsequently stirred for two hours at from 0° to 3° C. while the pH of 9 is maintained, thereafter adjusted with dilute aqueous hydrochloric acid to pH 5 and mixed with 29.5 parts of 4-(β-sulfatoethylsulfonyl)aniline. Stirring is continued at a temperature of about 5° to 8° C. for about a further four hours, during which the pH drops to a value from 1 to 1.5. Thereafter sodium carbonate is added to set a pH of 5.5.

The solution obtained is stirred into a solution of 18.8 parts of 1,4-diaminobenzene-2-sulfonic acid in 600 parts of water. A pH of 3.5 is set, and the reaction batch is further stirred at 80° C. for two hours while a pH of 3.5 is maintained with sodium carbonate, then cooled down to a temperature of 0° to 3° C. and adjusted with concentrated hydrochloric acid to a pH of 1.2. The diazotization of the aniline compound is then effected by means of 20 parts of an aqueous 5N sodium nitrite solution, excess nitrous acid is destroyed as usual with a little amido-sulfuric acid after the diazotization reaction. 23.9 parts of 2-amino-8-hydroxy-6-sulfonaphthalene are added and the coupling reaction is carried out at a pH of from 5 to 5.5 and a temperature of about 15° C. for 16 hours until complete.

The resulting novel monoazo compound of the formula (written in the form of the free acid)

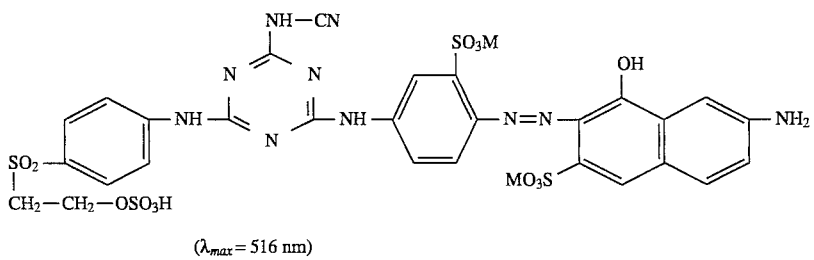

($\lambda_{max}$ = 516 nm)

is salted out by adding potassium chloride and isolated as alkali metal salt. It has very good fiber-reactive dye properties and produces on the materials mentioned in the description, such as in particular cotton, by the dyeing and printing techniques customary in the art of fiber-reactive dyes, strong red dyeings and prints having good fastness properties, of which the good lightfastness may be mentioned in particular.

EXAMPLE 2

The directions of Example 1 are followed to react 4.3 parts of cyanamide, 18.4 parts of cyanuric chloride and 29.5 parts of 4-(β-sulfatoethylsulfonyl)aniline. To the resulting solution of the secondary condensation product are added 26.8 parts of 1,4-diaminobenzene-2,5-disulfonic acid in 400 parts of water, a pH of 3.5 is set, and the reaction is carried out at 60° C., in the course of about one hour while maintaining a pH of 3.5. Thereafter the batch is cooled down to 0° to 3° C. adjusted with concentrated aqueous hydrochloric acid to a pH of 1.2, and the diazotization reaction is carried out in a conventional manner by adding 20 parts of an aqueous 5N sodium nitrite solution. After excess nitrous acid has been destroyed, 23.9 parts of 2-amino-8-hydroxy-6-sulfonaphthalene are added and the coupling reaction is carried out at a pH from 5 to 5.5 and at about 15° C.

The novel monoazo compound which, written in the form of the free acid, has the formula

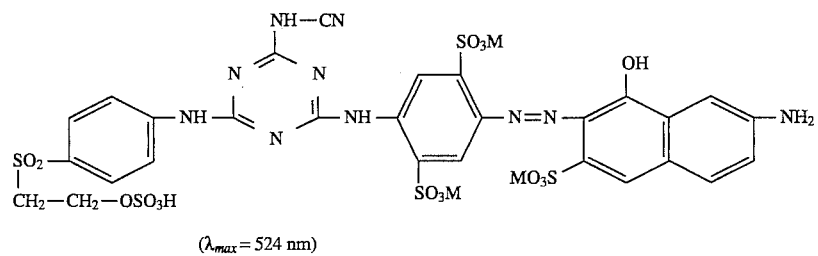

($\lambda_{max}$ = 524 nm)

is isolated by evaporating the reaction solution. It has very good fiber-reactive dye properties and produces on the fiber materials mentioned in the description, in particular on cotton, by the customary application and fixing techniques, strong red dyeings and prints having good fastness properties, of which the good lightfastness may be mentioned in particular.

EXAMPLE 3

A suspension of 19.3 parts of cyanuric chloride in 100 parts of ice and 200 parts of water is admixed by thorough stirring with a pH 5.5 solution of 28.1 parts of 4-(β-sulfatoethylsulfonyl)aniline in 200 parts of water. The reaction mixture is subsequently stirred at a pH of 2.5 to 3.0 for 30 minutes and at a temperature from 5° to 10° C. then heated over 30 minutes to 20° to 25° C. and subsequently stirred for about an hour. The resulting suspension is admixed with a pH 6 solution of 18.8 parts of 1,4-diaminobenzene-2-sulfonic acid in 200 parts of water and the mixture is subsequently stirred at a pH of 6 and 20° to 25° C. for about two hours.

Thereafter the batch is cooled down to 0° to 3° C., adjusted with concentrated aqueous hydrochloric acid to pH 1.2, and the diazotization reaction is carried out in a conventional manner by adding 20 parts of an aqueous 5N sodium nitrite solution. After excess nitrous acid has been removed, 23.9 parts of 2-amino-8-hydroxy-6-sulfonaphthalene are added and the coupling reaction is carried out at 15° to 20° C. and at a pH from 5 to 5.5.

The monoazo compound of the invention is isolated by evaporating the synthesis solution.

Alternatively, the monoazo compound of the invention can also be prepared as follows:

18.8 parts of 1,4-diaminobenzene-2-sulfonic acid are stirred into a suspension of 18.4 parts of cyanuric chloride in 200 parts of ice and 200 parts of water. Concentrated aqueous sodium hydroxide solution is used to set a pH of 8.5 and the batch is subsequently stirred at 0° to 3° C. for about two hours while the pH of 8.5 is maintained. Thereafter the batch is adjusted with dilute aqueous hydrochloric acid to pH 5 and admixed with 29.5 parts of 4-(β-sulfatoethylsulfonyl)aniline. Stirring is subsequently continued at about 5° to 8° C. for about four hours during which the pH falls to 1 to 1.5. Subsequently a diazotization reaction is carried out in a conventional manner by adding concentrated aqueous hydrochloric acid and aqueous 5N sodium nitrite solution and the coupling reaction is carried out as described above following addition of 24 parts of 2-amino-8-hydroxy-6-sulfonaphthalene.

The monoazo compound of the invention has, written in the form of the free acid, the formula

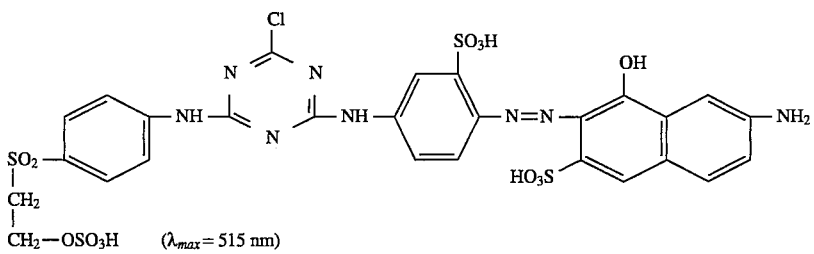

($\lambda_{max}$ = 515 nm)

and produces on the materials mentioned in the description, in particular cellulose fiber materials, for example cotton, by the dyeing and printing techniques customary for fiber-reactive dyes, strong red dyes and prints having good fastness properties, of which the good lightfastness may be mentioned in particular.

EXAMPLE 4

19.3 parts of cyanuric chloride and 28.1 parts of 4-(β-sulfatoethylsulfonyl)aniline are reacted with one another as described in Example 3. To the suspension thus obtained is added with stirring a pH 6 solution of 26.8 parts of 1,4-diaminobenzene-2,5-disulfonic acid in 200 parts of water and the reaction is carried out for about 3 hours at pH 6 and 20° to 25° C. with continued stirring until complete. The batch is subsequently cooled down to 0° to 3° C. and adjusted with concentrated aqueous hydrochloric acid to pH 1.2. The diazotization reaction is carried out in conventional manner by adding 20 parts of aqueous 5N sodium nitrite solution with stirring. After excess nitrous acid has been destroyed, 23.9 parts of 2-amino-8-hydroxy-6-sulfonaphthalene are added and the coupling reaction is carried out at about 15° to 20° C. and a pH of 5 to 5.5.

Alternatively, the monoazo compound of the invention can also be prepared by stirring 26.8 parts of 1,4-diamino-benzene-2,5-sulfonic acid into a suspension of 18.4 parts of cyanuric chloride in 200 parts of ice and 200 parts of water, adjusting with concentrated aqueous sodium hydroxide solution to pH 8.5, and maintaining from 0° to 30° C. for about two hours with continued stirring. Then dilute aqueous hydrochloric acid is added to pH 5, followed by 29.5 parts of 4-(β-sulfatoethylsulfonyl)aniline. Stirring is continued at about 5° to 8° C. for about four hours, during which the pH falls to a value from 1 to 1.5. This is followed by diazotization in conventional manner by adding concentrated aqueous hydrochloric acid and aqueous 5N sodium nitrite solution and the coupling reaction is carried out as described above following addition of 24 parts of 2-amino-8-hydroxy-6-sulfonaphthalene. The monoazo compound of the invention is isolated in conventional manner, for example by evaporating the synthesis solution or by salting out with sodium chloride or potassium chloride. Written in the form of the free acid, it has the formula

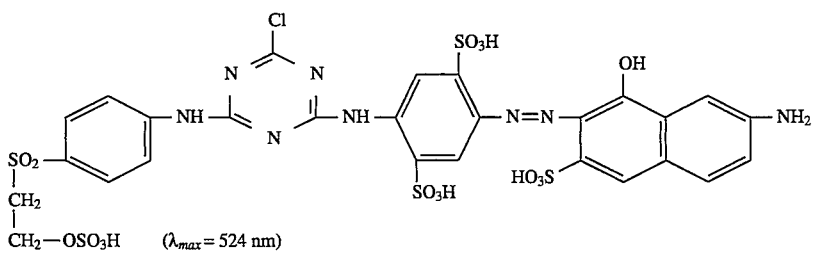

($\lambda_{max}$ = 524 nm)

and provides for example on cotton, by the application techniques customary for fiber-reactive dyes, strong red dyeings and prints having good fastness properties, of which the good lightfastness may be mentioned in particular.

EXAMPLE 5

A pH 4.5 solution of 28.1 parts of 3-(β-sulfatoethylsulfonyl)aniline in 400 parts of water is admixed, by thorough stirring, at 0° C. with 18.3 parts of cyanuric fluoride, the batch is subsequently stirred at pH 4.5 for about a further 15 minutes, 18.8 parts of 1,4-diamino-benzene-4-sulfonic acid are added, the pH is adjusted to 6.5, the batch is heated to 20° to 25° C., further stirred for about four hours while the pH of about 6.5 is maintained, and then cooled down to 0° C., and 20 parts of an aqueous 5N sodium nitrite solution are added. To diazotize the resulting condensation product of 3-(β-sulfatoethylsulfonyl)aniline, cyanuric fluoride and 1,4-diamino-benzene-2-sulfonic acid, the reaction batch has rapidly added to it, with thorough stirring, 30 parts of concentrated aqueous hydrochloric acid and is subsequently stirred for another hour. After excess nitrous acid has been removed, 23.9 parts of 2-amino-8-hydroxy-6-sulfonaphthalene are added and the coupling reaction is led to completion at a temperature from 15° to 20° C. and a pH from 5 to 5.5.

The novel monoazo compound has, written in the form of the free acid, the formula

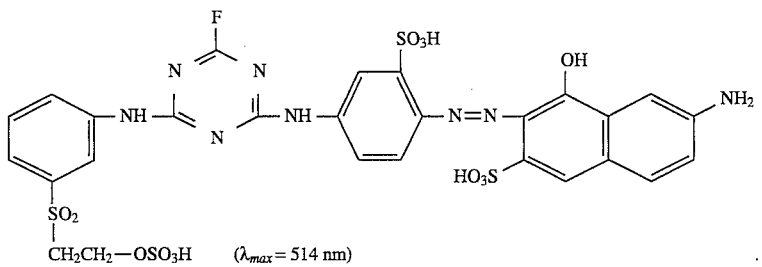

($\lambda_{max}$ = 514 nm)

It is precipitated from the synthesis solution in the form of an alkali metal salt by salting out with potassium chloride and isolated in conventional manner. It has very good fiber-reactive dye properties and provides for example on cellulose fibers, such as cotton, by the dyeing and printing techniques customary for fiber-reactive dyes, strong red shades having good fastness properties, of which the good lightfastness may be mentioned in particular.

EXAMPLES 6 TO 56

The Table Examples which follow describe further novel monoazo compounds conforming to the formula (A)

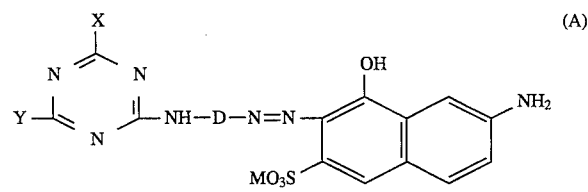

(A)

(where M is hydrogen or an alkali metal) in terms of their components. They can be prepared in the manner of the invention from the starting compounds evident from the formula (A) (the diaminobenzenesulfonic acid conforming to the formula $H_2N$—D—$NH_2$, cyanuric fluoride or cyanuric chloride, the compounds of the formula H—O—$R^A$ and $H_2N$—$R^B$ and also H—Y and the coupling component 2-amino-8-hydroxy-6-sulfonaphthalene). They have very good fiber-reactive dye properties and dye the materials mentioned in the description, in particular cellulose fiber materials, in high color strength and good fastness properties in the hue indicated for cotton in the respective Table Example.

| | Azo compound of formula (A) | | | |
|---|---|---|---|---|
| Ex. | Y | X | D | Hue |
| 6 | 3-(β-Sulfatoethylsulfonyl)phenylamino | Cyanoamino | ⌬-SO₃M~ | red (518) |
| 7 | 2-Methoxy-5-(β-sulfatoethylsulfonyl)phenylamino | " | " | red (515) |
| 8 | 4-Vinylsulfonylphenylamino | " | " | red (517) |
| 9 | 3-(β-sulfatoethylsulfonyl)phenylamino | " | 2,5-disulfophen-1,4-ylene | red (525) |
| 10 | 2-Methoxy-5-(β-sulfatoethylsulfonyl)phenylamino | " | " | red (523) |
| 11 | 4-Vinylsulfonylphenylamino | " | " | red (524) |
| 12 | 4-(β-Sulfatoethylsulfonyl)phenylamino | Fluorine | ⌬-SO₃M~ | red (516) |
| 13 | 2-Methoxy-5-(β-sulfatoethylsulfonyl)phenylamino | Fluorine | " | red (515) |
| 14 | 4-Vinylsulfonylphenylamino | Fluorine | " | red (516) |
| 15 | γ-(β'-Sulfatoethylsulfonyl)propylamino | Fluorine | " | red (514) |
| 16 | N-Phenyl-N-[β-(β'-sulfatoethylsulfonyl)ethyl]amino | Fluorine | " | red (513) |
| 17 | N-Phenyl-N-[γ-(β'-sulfatoethylsulfonyl)propyl]amino | Fluorine | " | red (514) |
| 18 | γ-(β'-Chloroethylsulfonyl)propylamino | Fluorine | " | red (515) |
| 19 | γ-Vinylsulfonylpropylamino | Fluorine | " | red (514) |
| 20 | Bis(β-vinylsulfonylethyl)amino | Fluorine | " | red (516) |
| 21 | Bis[β-(β'-chloroethylsulfonyl)ethyl]amino | Fluorine | " | red (517) |
| 22 | Bis[γ-(β'-chloroethylsulfonyl)propyl]amino | Fluorine | " | red (515) |
| 23 | 4-(β-Sulfatoethylsulfonyl)phenylamino | Fluorine | 2,5-Disulfophen-1,4-ylene | red (523) |
| 24 | 4-Vinylsulfonylphenylamino | Fluorine | " | red (522) |
| 25 | 3-(β-Sulfatoethylsulfonyl)vinylamino | Fluorine | " | red (524) |
| 26 | 2-Methoxy-5-(β-sulfatoethylsulfonyl)phenylamino | Fluorine | " | red (521) |
| 27 | γ-(β'-Sulfatoethylsulfonyl)propylamino | Fluorine | " | red (522) |
| 28 | γ-(β'-Chloroethylsulfonyl)propylamino | Fluorine | " | red (523) |
| 29 | γ-Vinylsulfonylpropylamino | Fluorine | " | red (521) |
| 30 | N-Phenyl-N-[β-(β'-sulfatoethylsulfonyl)ethyl]amino | Fluorine | " | red (521) |

-continued

| Ex. | Y | X | D | Hue |
|---|---|---|---|---|
| 31 | N-Phenyl-N-[γ-(β'-sulfatoethylsulfonyl)propyl]amino | Fluorine | " | red (522) |
| 32 | Bis(β-vinylsulfonylethyl)amino | Fluorine | " | red (524) |
| 33 | Bis[β-(β'-chloroethylsulfonyl)ethyl]amino | Fluorine | " | red (525) |
| 34 | Bis[γ-(β'-chloroethylsulfonyl)propyl]amino | Fluorine | " | red (523) |
| 35 | 4-Vinylsulfonylphenylamino | Chlorine | 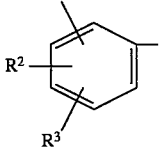 | red (514) |
| 36 | 3-(β-Sulfatoethylsulfonyl)phenylamino | Chlorine | " | red (513) |
| 37 | 2-Methoxy-5-(β-sulfatoethylsulfonyl)phenylamino | Chlorine | " | red (513) |
| 38 | γ-(β'-Sulfatoethylsulfonyl)propylamino | Chlorine | " | red (512) |
| 39 | γ-(β'-Chloroethylsulfonyl)propylamino | Chlorine | " | red (514) |
| 40 | γ-Vinylsulfonylpropylamino | Chlorine | " | red (513) |
| 41 | N-Phenyl-N-[β-(β'-sulfatoethylsulfonyl)ethyl]amino | Chlorine | " | red (512) |
| 42 | N-phenyl-N-[γ-(β'-sulfatoethylsulfonyl)propyl]amino | Chlorine | " | red (514) |
| 43 | Bis(β-vinylsulfonyl)ethylamino | Chlorine | " | red (515) |
| 44 | Bis[β-(β'-chloroethylsulfonyl)ethyl]amino | Chlorine | " | red (516) |
| 45 | Bis[γ-(β'-Chloroethylsulfonyl)propyl]amino | Chlorine | " | red (515) |
| 46 | 4-Vinylsulfonylphenylamino | Chlorine | 2,5-Disulfophen-1,4-ylene | red (522) |
| 47 | 3-(β-sulfatoethylsulfonyl)phenylamino | Chlorine | " | red (523) |
| 48 | 2-methoxy-5-(β-sulfatoethylsulfonyl)phenylamino | Chlorine | " | red (521) |
| 49 | γ-(β'-Sulfatoethylsulfonyl)propylamino | Chlorine | " | red (522) |
| 50 | γ-(β'-Chloroethylsulfonyl)propylamino | Chlorine | " | red (521) |
| 51 | γ-Vinylsulfonylpropylamino | Chlorine | " | red (520) |
| 52 | N-phenyl-N-[β-(β'-sulfatoethylsulfonyl)ethyl]amino | Chlorine | " | red (521) |
| 53 | N-Phenyl-N-[γ-(β'-sulfatoethylsulfonyl)propyl]amino | Chlorine | " | red (522) |
| 54 | Bis(β-vinylsulfonylethyl)amino | Chlorine | " | red (524) |
| 55 | Bis[β-(β'-chloroethylsulfonyl)ethyl]amino | Chlorine | " | red (525) |
| 56 | Bis[γ-(β'-chloroethylsulfonyl)propyl]amino | Chlorine | " | red (524) |

What is claimed is:

1. An azo compound conforming to the formula (1)

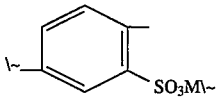

where:

M is hydrogen or an alkali metal;

m is 1 or 2;

X is fluorine, chlorine or a group of the formula (2a) or (2b)

$$R^A-O- \quad (2a)$$

$$R^B-NH- \quad (2b)$$

where $R^A$ is alkyl of 1 to 10 carbon atoms or cycloalkyl of 5 to 8 carbon atoms optionally substituted by 1 or 2 methyl groups, or is alkyl of 2 to 8 carbon atoms which is interrupted by one or two hetero groups selected from the groups of the formulae —O—, —NH—, —NH—CO—, —CO—NM—, —CO—, —SO$_2$—, —NH—SO$_2$— or —SO$_2$—NH—, or is benzyl or sulfoalkyl of 1 to 4 carbon atoms, and $R^B$ is hydrogen, alkyl of 1 to 10 carbon atoms or cycloalkyl of 5 to 8 carbon atoms which may be additionally substituted by 1 or 2 methyl groups, or is alkyl of 2 to 8 carbon atoms which is interrupted by one or two hetero groups selected from the groups of the formulae —O—, —NH—, —NH—CO—, —CO—NH—, —CO—, —SO$_2$—, —NH—SO$_2$— or —SO$_2$—NH—, or is benzyl sulfoalkyl of 1 to 4 carbon atoms or cyano;

Y is a group of the formula (3a)

$$R^0-NH- \quad (3a)$$

where $R^0$ is a group of the formula (4a), (4b) or (4c)

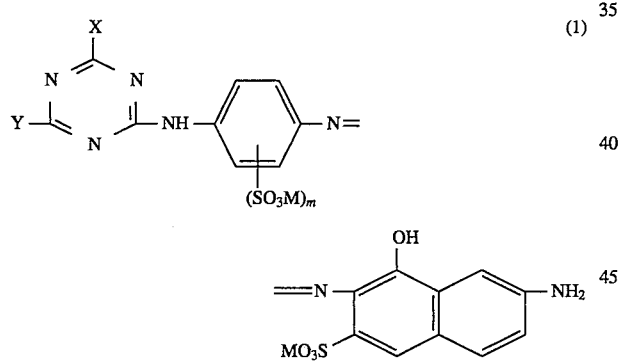

-continued

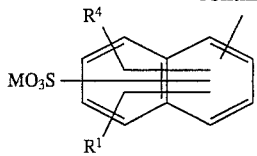
(4c)

where

M is as defined above,

Z is vinyl or is ethyl which is substituted in the β-position by a substituent which is eliminable by alkali to leave the vinyl group, alk is alkylene of 2 to 4 carbon atoms, $R^1$ is hydrogen, carboxy, sulfo or a group of the formula —$SO_2$—Z, wherein Z is as defined above, $R^2$ is hydrogen, alkyl of 1 to 4 carbon atoms, alkoxy of 1 to 4 carbon atoms, chlorine, bromine, carboxy, sulfo or nitro;

$R^3$ is hydrogen, alkyl of 1 to 4 carbon atoms, alkoxy of 1 to 4 carbon atoms, chlorine or bromine, and $R^4$ is hydrogen, sulfo or carboxy, or Y is a group of the formula (3b)

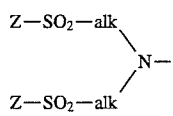
(3b)

where Z and alk are each as defined above, or

Y is a group of the formula (3c)

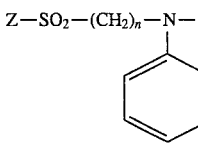
(3c)

where n is from 1 to 4, and

Z is vinyl or is ethyl which is substituted in the β-position by a substituent which is eliminated by alkali to leave the vinyl group.

2. A compound as claimed in claim 1, wherein X is chlorine or fluorine.

3. A compound as claimed in claim 1, wherein X is cyanoamino.

4. The compound as claimed in claim 1, wherein X is a cyanoamino, Y is a group of the formula (3a) and $R^1$ is a group of the formula —$SO_2$—Z, in which Z is defined in claim 1.

5. The compound as claimed in claim 4, wherein $R^0$ is a group of the formula (4b), $R^2$ is hydrogen, methyl, methoxy or ethoxy and $R^3$ is hydrogen, methoxy or ethoxy.

6. A compound as claimed in claim 4 of the formula

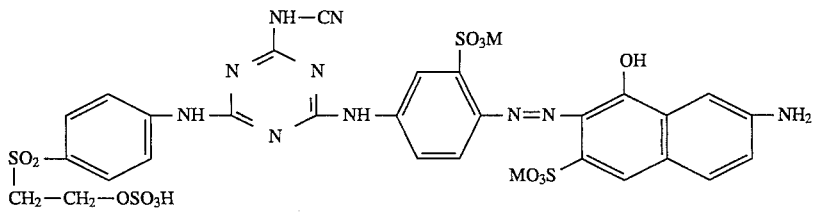

where M is hydrogen or an alkali metal.

7. A compound as claimed in claim 4 of the formula

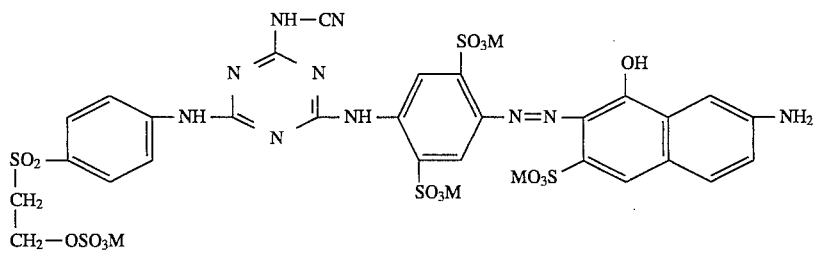

where M is hydrogen or an alkali metal.

* * * * *